United States Patent [19]

Nakashima et al.

[11] Patent Number: 4,572,271
[45] Date of Patent: Feb. 25, 1986

[54] METHOD OF PRODUCING A MACHINE PART OF FIBER-REINFORCED COMPOSITE MATERIAL, THE FIBER-REINFORCEMENT BODY AND THE MACHINE PART

[75] Inventors: Waichiro Nakashima, Kawagoe; Hiroshi Sasaki, Hatoyama; Katsuhiro Nishizaki, Tokorozawa, all of Japan

[73] Assignee: Honda Giken Kogyo Kabushiki Kaisha, Tokyo, Japan

[21] Appl. No.: 616,609

[22] Filed: Jul. 10, 1984

Related U.S. Application Data

[63] Continuation of Ser. No. 358,319, Mar. 15, 1982, abandoned.

[30] Foreign Application Priority Data

Mar. 20, 1981 [JP] Japan .................................. 56-40993

[51] Int. Cl.$^4$ .............................................. B22D 19/14
[52] U.S. Cl. ........................................ 164/97; 228/190
[58] Field of Search ......................... 164/97, 108–111; 428/588, 590, 605, 607, 614; 228/190, 193, 904; 29/419

[56] References Cited

U.S. PATENT DOCUMENTS 3,864,807  2/1975  Schneider et al. .............. 428/614 X

FOREIGN PATENT DOCUMENTS 52-13180  4/1977  Japan ..................................... 164/97

Primary Examiner—Kuang Y. Lin

[57] ABSTRACT

A method of producing a machine part of a fiber-reinforced composite material comprising forming a fibrous-shaped body by effecting a partial diffusion-bonding of a plurality of inorganic fibers by copper solder. The fibrous-shaped body is self-supporting and is of relatively high density of the order between 2.0 and 5.0 g/cc. The mechanical part is produced by integrating the fibrous-shaped body with a matrix metal by high pressure solidification.

11 Claims, 6 Drawing Figures

METHOD OF PRODUCING A MACHINE PART OF FIBER-REINFORCED COMPOSITE MATERIAL, THE FIBER-REINFORCEMENT BODY AND THE MACHINE PART

This is a continuation of application Ser. No. 358,319 filed Mar. 15, 1982, now abandoned.

FIELD OF THE INVENTION

The present invention relates to a method of producing a machine part of a fiber-reinforced composite material formed by integrating inorganic fibrous material with a matrix by a high-pressure solidification casting method. The present invention also relates to the fiber shaped body serving as the reinforcement and to the resulting machine part.

The term "high-pressure solidification casting method" as used in this specification refers to a special casting method in which a high hydrostatic pressure of 500 to 2,000 Kg/cm$^2$ is applied to the molten metal in a casting mold and the molten metal is solidified under application of this high hydrostatic pressure. This casting method permits, in integrating the fibrous material with the matrix, the fibrous material to be sufficiently impregnated over the entire extent thereof with the molten metal which constitutes the matrix. According to this casting method, therefore, it is possible to obtain a mechanical part of composite material having a high mechanical strength.

PRIOR ART

The present inventors have already proposed a method of producing a fiber-reinforced composite material in which a fibrous shaped body having a bulk density of between 0.05 to 2.0 g/cc, consisting of highly elastic inorganic fibers with a soldering material of a silver solder system partially diffusionbonding fibrous phases, is integrated with the matrix by the above described high-pressure solidification casting method. This is disclosed in Japanese Patent Application No. 58471/1977. Due to the partial diffusion-bonding between the fibrous phases by the silver solder, the fibrous-shaped body has a high stability or self-supporting nature even during the casting. It is, therefore, possible to adequately reinforce the desired portion of the mechanical part with the fibers.

As a result of intense study, the above-described method has proved to involve the following problem. Namely, although the silver solder can be sufficiently diffused over the entire extent of the fibrous body to effect the diffusion bonding of fibrous phases when the bulk density of the fibrous shaped body falls between 0.05 and 2.0 g/cc, it is not possible to attain a sufficient impregnation of the silver solder into the entire extent of the fibrous shaped body, when the bulk density of the fibrous shaped body is increased beyond the upper limit of the above-specified range to achieve a higher reinforcing effect by the fibers. In such a case, therefore, the fibrous shaped body is unstable and it is not possible to adequately reinforce the required portion of the mechanical part as the final product.

SUMMARY OF THE INVENTION

Accordingly, an object of the invention is to provide a method of producing a mechanical part of a composite material which permits an adequate fiber-reinforcement of the desired portion of the part by ensuring partial diffusion-bonding of the fibrous phases over the entire extent of the fibrous shaped body, even when the bulk density of the fibrous shaped body is incresed for attaining a higher reinforcement effect.

To this end, according to the invention, an inorganic fibrous shaped body is formed by partial diffusion-bonding of its fibrous phases by a copper soldering material, and the inorganic fibrous shaped body, thus formed, is integrated with the matrix by the high-pressure solidification casting method.

As the inorganic fibers, fibers having a high elasticity, such as metallic fibers including stainless steel fibers or non-metallic fibers including carbon fibers are preferably used.

The partial diffusion-bonding between the fibrous phases by the copper solder will be explained hereinunder.

A multiplicity of unidirectional fibers are inserted into a heat-resistant shaping mold, such as a quartz glass tube, such that the bulk density falls within a predetermined range, together with a copper solder material, such as a copper wire. Then, this shaping mold is placed in a heating furnace which is held at a reducing or inert gas atmosphere or under vacuum. Then, the unidirectional fibers and the copper wire and heated to a high temperature together with the shaping mold, so that the fibers are impregnated by the molten copper by capillary action. In this case, the bulk density of the fibrous shaped body thus formed is substantially equal to the bulk density of the fibers as attained when the fibers are inserted into the shaping mold.

In the fabrication of, for example, a connecting rod of an internal combustion engine, the bulk density of the rod-shaped fibrous shaped body for reinforcing the rod portion of the connecting rod is preferably selected to fall between 2.5 to 5.0 g/cc, which is desirable from the view point of formability, stability and affinity to the matrix. The copper solder can uniformly impregnate the fibrous phases even with such a high bulk density, so that it is possible to effect a partial diffusion-bonding over the entire area of the shaped body. A bulk density less than 2.0 g/cc is not desirable because, in such a case, the amount of fibers is so small that minute gaps for producing capillary action cannot be formed. A bulk density in excess of 5.0 g/cc is not desirable because such a high bulk density unfavorably deteriorates the affinity of the fibrous shaped body to the matrix.

The invention also contemplates the formation of the fibrous shaped body of high bulk density, adapted for reinforcement in the matrix metal of the machine part, comprising a plurality of inorganic fibers partially diffusion-bonded by copper solder.

In further accordance with the invention, there is provided the machine part comprising the matrix metal with the fibrous shaped reinforcing body integrated in said matrix metal, said fibrous shaped reinforcing body comprising a plurality of inorganic fibers at least partially diffusion-bonded by copper solder.

The above and other objects, features and advantages of the invention will become clear from the following description of a preferred embodiment taken in conjunction with the accompanying drawings.

DESCRIPTION OF THE PREFERRED EMBODIMENT

Hereinafter will be described a preferred embodiment of the invention applied to the production of a connecting rod for an internal combustion engine.

Figure 3:
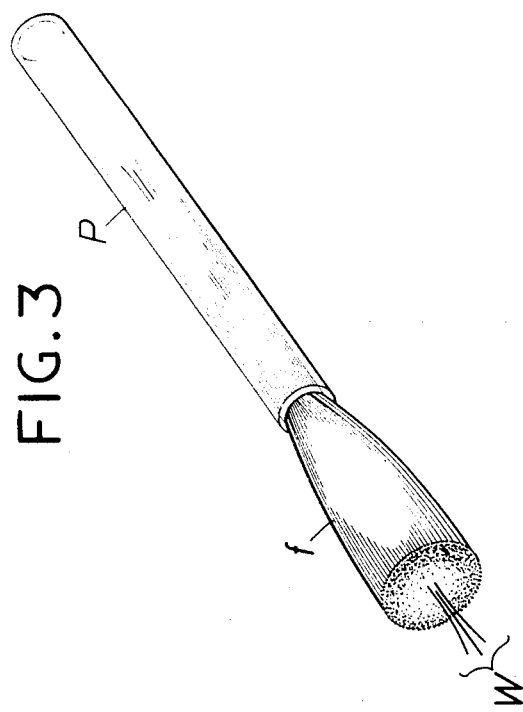
FIG. 3 is a perspective view illustrating the state of insertion of unidirectional fibers into a shaping mold together with copper solder.

Referring to FIG. 3, a fiber bundle consisting of a multiplicity of stainless steel fibers f each having a polygonal cross-section of a mean diameter of about $30\mu$, with three copper wires W disposed at the center of the bundle, each copper wire having a diameter of about 0.2 mm, is inserted into a shaping mold P consisting of a quartz tube. The shaping mold P is then placed in a heating furnace which is held under a reducing gas atmosphere, such as hydrogen gas. The shaping mold P containing the fiber bundle and copper wires W was heated at a temperature of about 1,200° C. for 10 minutes and was then cooled in the furnace to form a rod-shaped fibrous shaped body F.

Figure 4:
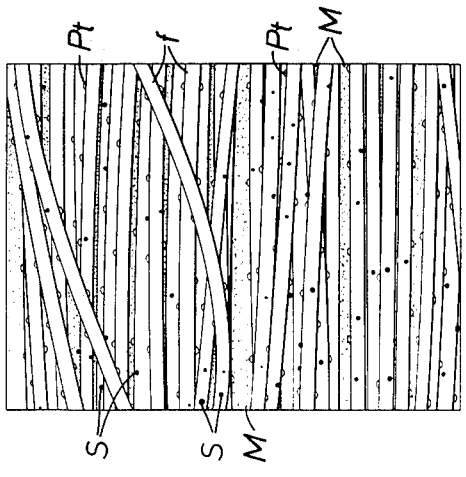
FIG. 4 is a microscopic view representative of a fibrous shaped body.

The structure of this fibrous shaped body was examined under a microscope at a magnification of 110 times, the result of which is shown in FIG. 4. In FIG. 4, the projecting portions Pt around each fiber and the black spots S are the copper. It is seen that the copper impregnates the bundle of the fibers uniformly from the core portion (lower side in FIG. 4) to the peripheral portion (upper side in FIG. 4) of the fiber bundle to achieve partial diffusion-bonding of fibrous phases over the entire extent of the fibrous shaped body. This means that the fibrous shaped body, thus formed, has a high self-supporting nature or stability. It's bulk density was 2.65 g/cc.

Figure 1:
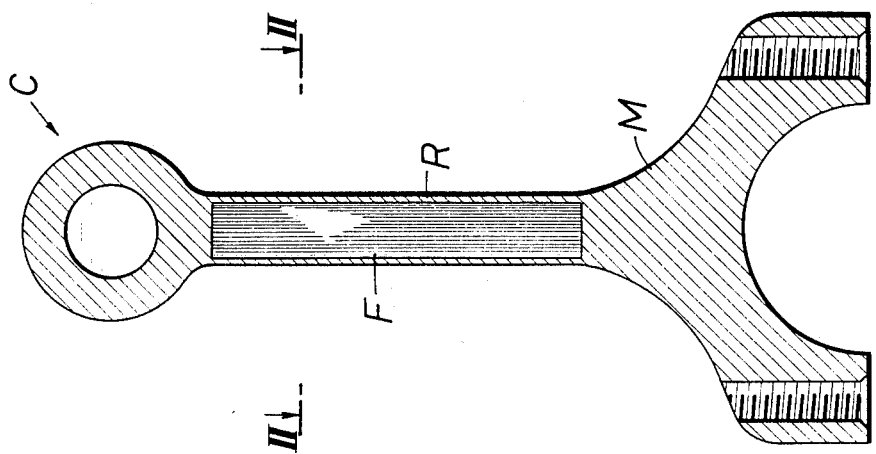
FIG. 1 is a front elevational view, in section, of a connecting rod of an internal combustion engine, produced in accordance with the method of the invention.
Figure 2:
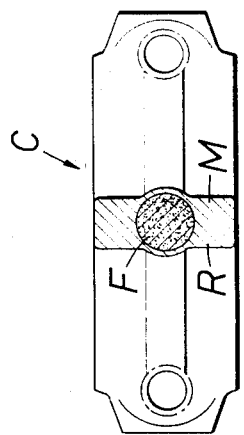
FIG. 2 is a sectional view taken along line II—II in FIG. 1.

The fibrous shaped body, thus formed, was then placed in a cavity portion, corresponding to the rod portion of a connecting rod for an internal combustion engine, in a casting mold for forming the connecting rod. Then, the aforementioed high-pressure solidification casting was conducted using an aluminum alloy (JIS AC8B) as the matrix alloy, to obtain a connecting rod C with its rod portion R reinforced by the fibers, as shown in FIGS. 1 and 2.

Figure 5:
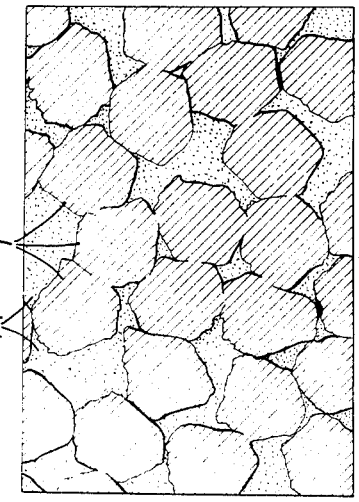
FIG. 5 is a microscopic view representative of the rod portion of a connecting rod in cross-section with a magnification of 540 times.
Figure 6:
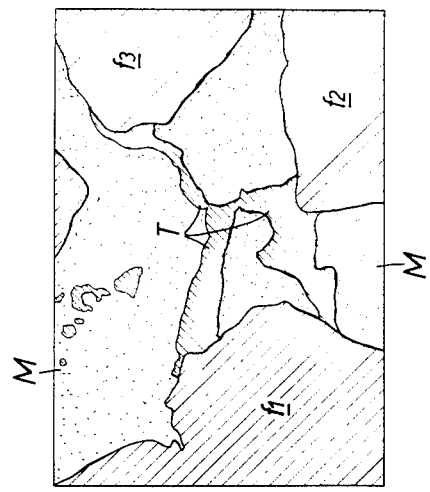
FIG. 6 is a microscopic view representative of the rod portion of a connecting rod in cross-section with a magnification 1,400 times.

The rod portion R of the connecting rod C was cut at right angles to the axis and the cut surface was examined under a microscope at magnifications of 540 and 1,400 times, the result of which are shown in FIGS. 5 and 6. In FIG. 5, it will be seen that the stainless steel fibers f each having a polygonal crosssection are well bonded to the matrix M with high affinity. In FIG. 6, the spots T of substantially triangular form, positioned between adjacent fibers are the copper combined with black aluminum alloy. This establishes that the fibers $f_1$, $f_2$, $f_3$ appearing at the left lower portion, the right lower portion and the right upper portion are partially bonded even after the casting, due to the presence of these copper phases in triangular form.

As has been described, according to the invention, fibrous phases are partially diffusion-bonded by a copper solder, so that the partial diffusion bonding can be made uniformly over the entire extent of the fibrous shaped body even when the latter has a high bulk density. It is, therefore, possible to obtain a fibrous shaped body having good stability or self-supporting nature not only when the fibers are arranged unidirectionally but also when the fibers are arranged two-dimensionally or at random. Since this high stability of the fibrous shaped body can be maintained even during the high-pressure solidification casting, it is possible to adequately reinforce the desired portion of the machine part as the final product.

Thus, according to the method of the invention, it is possible to produce a machine part having a high mechanical strength from fiber-reinforced composite material.

What is claimed is:

1. A method of producing a machine part of a fiber-reinforced composite material, said method comprising forming a fibrous shaped body by effecting a partial diffusion-bonding of a plurality of metallic fibers by copper solder; said fibrous shaped body having a bulk density of more than 2.0 and up to 5.0 g/cc and forming a mechanical part of fiber-reinforced composite material by integrating the fibrous shaped body with a matrix by high-pressure solidification.

2. A method as claimed in claim 1, wherein said forming of the fibrous shaped body comprises placing said metallic fibers in a heat-resistant shaping mold together with the copper solder at a predetermined bulk density; and heating the shaping mold to cause said copper solder to impregnate fine spaces between adjacent fibers by capillary action.

3. A method as claimed in claim 2 wherein said shaping mold has an atmosphere consisting of a reducing gas, an inert gas or a vacuum.

4. A method as claimed in claim 1 wherein said metallic fibers comprise stainless steel.

5. A method as claimed in claim 1 wherein said copper solder consists of copper wires.

6. A method as claimed in claim 2 wherein said fibers are in a bundle and are of polygon cross-section with a mean diameter of about $30\mu$ and said copper solder is in the form of copper wires disposed centrally in said bundle and having a diameter of about 0.2 mm.

7. A self-supporting fibrous shaped body adapted for forming a reinforcement in a non-copper matrix metal under high-pressure solidification, said fibrous shaped body comprising a plurality of metallic fibers at least partially diffusion-bonded by copper solder substantially over the entire extent of the shaped body.

8. A fibrous shaped body as claimed in claim 7 wherein said metallic fibers include stainless steel fibers.

9. A machine part comprising a non-copper matrix metal and a fibrous shaped reinforcing body integrated in said matrix metal, said fibrous shaped reinforcing body comprising a plurality of metallic fibers at least partially diffusion-bonded by copper solder over substantially the entire extent of said body, said fibrous shaped reinforcing body having a bulk density of more than 2.0 and up to 5.0 g/cc.

10. A machine part as claimed in claim 9 wherein said fibrous shaped reinforcing body is integrated in said matrix metal by high-pressure solidification casting.

11. A self-supporting fibrous shaped body adapted for forming a reinforcement in a non-copper matrix metal under high-pressure solidification, said fibrous shaped body comprising a plurality of metallic fibers at least partially diffusion-bonded by copper solder substantially over the entire extent of the shaped body, said fibrous shaped body having a bulk density of more than 2.0 and up to 5.0 g/cc.

* * * * *